United States Patent
Lu (10) Patent No.: US 9,625,999 B2
(45) Date of Patent: Apr. 18, 2017

(54) INTEGRATED INPUT CONTROL AND OUTPUT DISPLAY SYSTEM

(71) Applicant: SAMSUNG DISPLAY CO., LTD., Yongin, Gyeonggi-Do (KR)

(72) Inventor: Ning Lu, Saratoga, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/458,200

(22) Filed: Aug. 12, 2014

(65) Prior Publication Data

US 2015/0123945 A1    May 7, 2015

Related U.S. Application Data (60) Provisional application No. 61/899,729, filed on Nov. 4, 2013.

(51) Int. Cl.
*G06F 3/01* (2006.01)
*G06F 3/0488* (2013.01)
*G06F 3/03* (2006.01)

(52) U.S. Cl.
CPC ............ *G06F 3/017* (2013.01); *G06F 3/0304* (2013.01); *G06F 3/0488* (2013.01); *G06F 2203/04108* (2013.01); *G06T 2207/10004* (2013.01); *G06T 2207/10016* (2013.01); *G06T 2207/20221* (2013.01)

(58) Field of Classification Search
CPC .... G06F 1/1632; G06F 1/169; G06F 15/0225; G09G 2370/24; G09G 5/006
USPC .............................. 710/303, 316, 304, 62, 73
See application file for complete search history.

(56) References Cited

U.S. PATENT DOCUMENTS

| | | | |
|---|---|---|---|
| 7,010,634 B2* | 3/2006 | Silvester | G06F 1/1626 710/301 |
| 2003/0007321 A1* | 1/2003 | Dayley | G06F 1/181 361/679.6 |
| 2004/0217937 A1* | 11/2004 | Moskalik | G06F 1/1632 345/156 |
| 2006/0146491 A1* | 7/2006 | Chen | G06F 3/023 361/679.08 |

FOREIGN PATENT DOCUMENTS

| | | |
|---|---|---|
| JP | 2007-168649 A | 7/2007 |
| JP | 2012-226670 A | 11/2012 |
| KR | 10-2012-0022239 A | 3/2012 |
| KR | 10-2013-0038544 A | 4/2013 |

* cited by examiner

*Primary Examiner* — Koosha Sharifi-Tafreshi
(74) *Attorney, Agent, or Firm* — Lewis Roca Rothgerber Christie LLP (57) ABSTRACT

An integrated input control and output rendering system for a processor-driven user device is provided. The system integrates input sensors (such as a keyboard, mouse, touchpad, camera, etc.) and output actuators (such as a display panel, speaker, robot, etc.) into a device independently of the user device and the applications running on the user device. The system includes an input logic engine to interpret input signals from various input devices together with an output rendering engine to output appropriate output signals in response to the input signals.

20 Claims, 7 Drawing Sheets

INTEGRATED INPUT CONTROL AND OUTPUT DISPLAY SYSTEM

CROSS-REFERENCE TO RELATED APPLICATION(S)

This application claims priority to and the benefit of U.S. Provisional Application 61/899,729, entitled "INTEGRATED INPUT CONTROL AND OUTPUT DISPLAY SYSTEM," filed on Nov. 4, 2013, the entire content of which is incorporated by reference herein.

BACKGROUND

1. Field

Aspects of embodiments of the present invention relate to an integrated input control and output rendering system.

2. Related Art

The proliferation of processor-driven electronic devices, including, for example, flat screen display devices, touch screens, and "smart" devices (such as smartphones, tablet computers, etc.), has caused a great increase in the replacement of traditional electronic devices (e.g., televisions, cameras) with more versatile flat screen display devices, touch screens, and applications (or "apps") that run on the smartphones and other smart devices.

Such devices, however, may have their own processors and operating systems—together with their associated processes, priorities, interrupts, and polling—that are replacing more traditional dedicated (and specialized) circuitry for input control and output rendering. Accordingly, adequate response time for acknowledging input actions or commands (such as touching a portion of the display, or moving a device such as a camera lens), or for overlaying other information can be challenging for some types of input since the time and overhead needed to go through the stack of operating system routines to process the input action or data and then acknowledge, respond, or display it to the user through an output display or other rendering device (e.g., speakers) can exceed real time response criteria. Further, alternatives to dealing with real time response criteria, such as more abbreviated processing, may provide insufficient functionality to satisfy users.

Such a delay or abbreviated processing may cause the display device, touch screen, or smart device to lag (or appear to lag) behind the user's input or deliver undesired content, which can lead to a poorer user experience. Even if the display device or smart device may be keeping up with the input, the appearance of lag (such as not timely acknowledging a user input command with the appropriate output action, or not displaying overlay data properly) creates the appearance to the user that the display device or smart device is not keeping up. This can lead to situations such as positive feedback (e.g., where the user tries to re-enter the input command, often multiple times) or unnecessary pausing by the user waiting for the appropriate acknowledgements or poorer displayed images and corresponding overlay information.

SUMMARY

Embodiments of the present invention are directed to an integrated input control and output rendering system that circumvents the above and other problems of existing systems. Further embodiments are directed to adding feedback logic in the I/O end of electronic devices that can be configured and specified by the applications that run on the electronic devices.

Still further embodiments of the present invention are directed to using an overlay logic engine, such as in a display device, to directly send user device commands, together with a display rendering engine to interpret the user device commands and process them immediately and independently of the device processor or app interface, thereby allowing the appropriate output rendering (such as updating the display device) to take place concurrently with the normal screen image of the display device. Still further embodiments of the present invention are directed to integrating input sensors (such as a keyboard, mouse, touchpad, camera, biological sensor (e.g., heart rate monitor, thermometer for body temperature), etc.) and output actuators (such as a display panel, speaker, robot, etc.) of a processor-driven user device into an integrated I/O device independently from the user device and its associated processor or applications.

In an embodiment of the present invention, an input/output (I/O) processor for controlling I/O of a user device is provided. The user device includes a device processor, an input device, and an output device. The I/O processor includes an input logic engine configured to receive and process input data from the input device without processing by the device processor, an output rendering engine configured to convert the processed input data into corresponding output data and send to the output device without processing by the device processor, and a control interface configured to transfer the processed input data from the input logic engine to the output rendering engine without processing by the device processor.

The input device may include a touch sensor configured to detect a user's touch. The input data may include touch sensor data corresponding to the user's touch. The output device may include a display panel configured to display an image using image data. The output data may include the image data adjusted to reflect the user's touch.

The input device may include a hovering sensor configured to detect a user's hover. The input data may include hovering sensor data corresponding to the user's hover. The output device may include a sound device configured to play sound using sound data. The output data may include the sound data adjusted to reflect the user's hover.

The input device may include a camera configured to detect a user's gesture. The input data may include gesture sensor data corresponding to the user's gesture. The output device may include a display panel configured to display an image using image data. The output data may include the image data adjusted to reflect the user's gesture.

The input device may include a light sensor configured to detect ambient light. The input data may include light sensor data corresponding to the ambient light. The output device may include a display panel configured to display an image using image data. The output data may include the image data adjusted to reflect the ambient light.

The input device may include a network interface configured to supply streaming data and a graphics content as the input data. The output device may include a display panel configured to display an image using image data. The output data may include the streaming data converted into the image data and overlaid with the graphics content. The output rendering engine may be further configured to adjust a display location of the overlaying graphics content according to a content of the image data.

The input device may include a camera configured to supply video data. The input data may include the video data and overlay data supplied from an input source. The output device may include a display panel configured to display an image using image data. The output data may include the video data converted into the image data and overlaid with the overlay data.

The I/O processor may further include a display buffer configured to receive image data from the device processor. The output device may include a display panel configured to display an image using the image data. The control interface may include an overlay buffer configured to transfer the processed input data as overlay data. The output rendering engine may be further configured to overlay the image data from the display buffer with the overlay data from the overlay buffer. The output data may include the image data as overlaid by the overlay data.

In another embodiment of the present invention, a method of controlling input/output (I/O) of a user device by an I/O processor is provided. The user device includes a device processor, an input device, and an output device. The I/O processor includes an input logic engine, an output rendering engine, and a control interface. The method includes: receiving and processing, by the input logic engine, input data from the input device without processing by the device processor; converting, by the output rendering engine, the processed input data into corresponding output data and sending to the output device without processing by the device processor; and transferring, by the control interface, the processed input data from the input logic engine to the output rendering engine without processing by the device processor.

The input device may include a touch sensor configured to detect a user's touch. The output device may include a display panel configured to display an image using image data. The method may further include: receiving, by the input logic engine, touch sensor data corresponding to the user's touch as the input data from the touch sensor; and adjusting, by the output rendering engine, the image data to reflect the user's touch and sending the adjusted image data as the output data to the display panel.

The input device may include a hovering sensor configured to detect a user's hover. The output device may include a sound device configured to play sound using sound data. The method may further include: receiving, by the input logic engine, hovering sensor data corresponding to the user's hover as the input data from the hovering sensor; and adjusting, by the output rendering engine, the sound data to reflect the user's hover and sending the adjusted sound data as the output data to the sound device.

The input device may include a camera configured to detect a user's gesture. The output device may include a display panel configured to display an image using image data. The method may further include: receiving, by the input logic engine, gesture sensor data corresponding to the user's gesture as the input data from the camera; and adjusting, by the output rendering engine, the image data to reflect the user's gesture and sending the adjusted image data as the output data to the display panel.

The input device may include a light sensor configured to detect ambient light. The output device may include a display panel configured to display an image using image data. The method may further include: receiving, by the input logic engine, light sensor data corresponding to the ambient light as the input data from the light sensor; and adjusting, by the output rendering engine, the image data to reflect the ambient light and sending the adjusted image data as the output data to the display panel.

The input device may include a network interface configured to supply streaming data and a graphics content as the input data. The output device may include a display panel configured to display an image using image data. The method may further include: receiving, by the input logic engine, the streaming data and the graphics content as the input data from the network interface; converting, by the output rendering engine, the streaming data into the image data; overlaying, by the output rendering engine, the image data with the graphics content and sending the overlaid image data as the output data to the display panel; and adjusting, by the output rendering engine, a display location of the overlaying graphics content according to a content of the image data.

The input device may include a camera configured to supply video data. The output device may include a display panel configured to display an image using image data. The method may further include: receiving, by the input logic engine, video data from the camera and overlay data from an input source; converting, by the output rendering engine, the video data into the image data; and overlaying, by the output rendering engine, the image data with the overlay data and sending the overlaid image data as the output data to the display panel.

The I/O processor may further include a display buffer configured to receive image data from the device processor. The output device may include a display panel configured to display an image using the image data. The control interface may include an overlay buffer configured to transfer the processed input data as overlay data. The method may further include overlaying, by the output rendering engine, the image data from the display buffer with the overlay data from the overlay buffer and sending the overlaid image data as the output data to the display panel.

In yet another embodiment of the present invention, a display device is provided. The display device includes a display device processor, an input device, a display panel configured to display an image using image data, and an input/output (I/O) processor for controlling I/O of the display device. The I/O processor may include an input logic engine configured to receive and process input data from the input device without processing by the display device processor, an output rendering engine configured to convert the processed input data into corresponding said image data and send to the display panel without processing by the display device processor, and a control interface configured to transfer the processed input data from the input logic engine to the output rendering engine without processing by the display device processor.

The input device may include a touch sensor configured to detect a user's touch. The input data may include touch sensor data corresponding to the user's touch. The image data may be adjusted to reflect the user's touch.

The input device may include a camera configured to detect a user's gesture. The input data may include gesture sensor data corresponding to the user's gesture. The image data may be adjusted to reflect the user's gesture.

The input device may include a light sensor configured to detect ambient light. The input data may include light sensor data corresponding to the ambient light. The image data may be adjusted to reflect the ambient light.

Embodiments of the present invention avoid the drawbacks of processor-driven user devices, such as display devices, touch screens, and smartphones, whose input control and corresponding output rendering response times may not maintain real time performance (or only maintain it at the expense of acceptable functionality), which can lead to mistakes, positive feedback, and poor user experience.

BRIEF DESCRIPTION OF THE DRAWINGS

The accompanying drawings, together with the specification, illustrate example embodiments of the present invention. These drawings, together with the description, serve to better explain aspects and principles of the present invention.

DETAILED DESCRIPTION

Example embodiments of the present invention will now be described with reference to the accompanying drawings. In the drawings, the same or similar reference numerals refer to the same or similar elements throughout. Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

In one or more embodiments, an integrated input control and output rendering system is provided. The integrated input control and output rendering system may be part of a processor-driven user device, such as a display device, touch screen, or smartphone. The integrated input control and output rendering system may shortcut the user device processor (or processors), offloading input/output (I/O) operations normally performed by the user device processors to improve response time, functionality, or otherwise improve the user experience. For example, the integrated I/O rendering system may include one or more I/O processors dedicated to performing I/O operations. On a smart device, for instance (like a smartphone), these I/O processors may circumvent the usual application-driven approach of the smart device, where a central processor or group of processors treats everything like a user application (or app), with corresponding prioritizing and other operating-system-specific processing.

Figure 1:
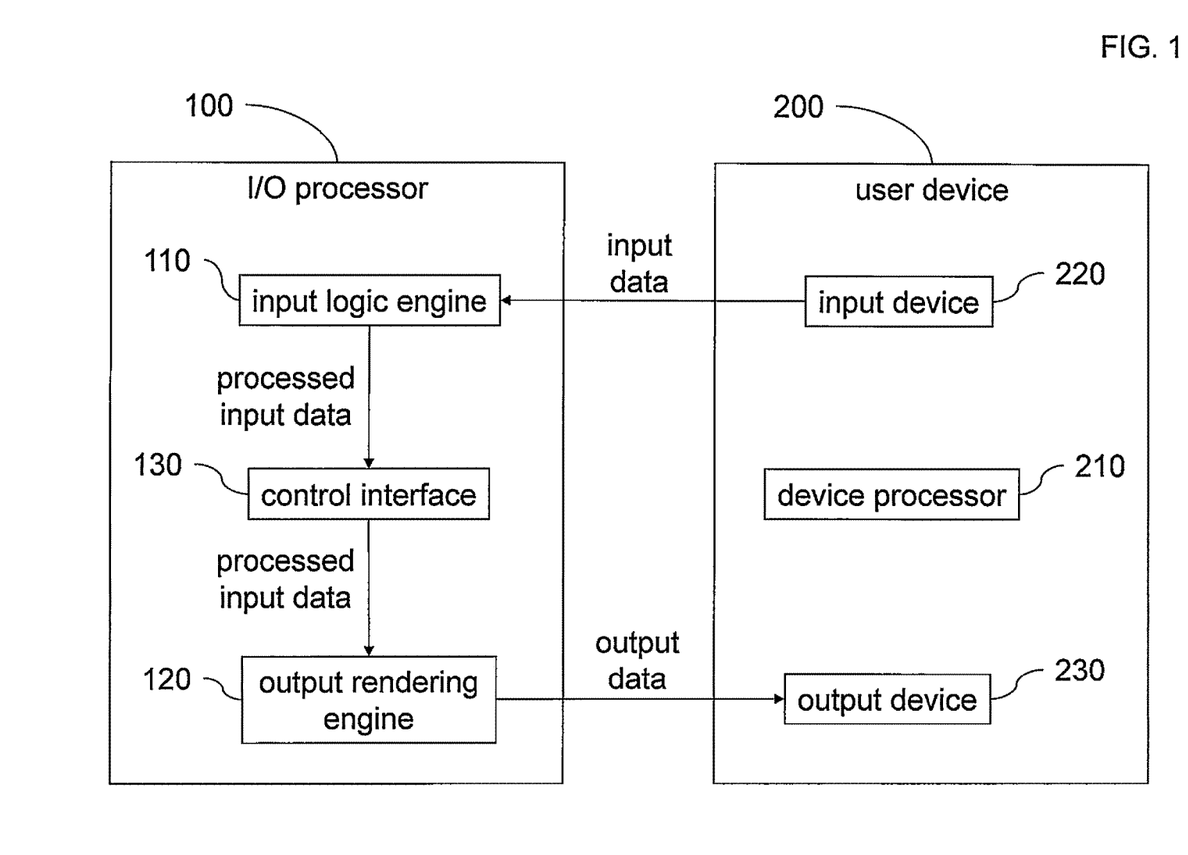
FIG. 1 is a block diagram illustrating an example I/O processor for controlling I/O of a user device according to an embodiment of the present invention.

FIG. 1 is a block diagram illustrating an example I/O processor 100 for controlling I/O of a user device 200 according to an embodiment of the present invention.

Referring to FIG. 1, the user device 200 includes a device processor 210 (or processors), an input device 220, and an output device 230. The I/O processor 100 includes an input logic engine 110, an output rendering engine 120, and a control interface 130. The input logic engine 110 is configured to receive and process input data from the input device 220 without processing by the device processor 210. The output rendering engine 120 is configured to convert the processed input data into corresponding output data and send to the output device 230 without processing by the device processor 210. The control interface 130 is configured to transfer the processed input data from the input logic engine 110 to the output rendering engine 120 without processing by the device processor 210.

The input device 220 may be any input device capable of receiving input and generating corresponding input signals as the input data. For example, the input device 220 may be a touch sensor configured to sense a user's touch, with the input data being touch sensor data corresponding to the user's touch. In another embodiment, the input device 220 may be a hovering sensor configured to detect a user's hover, with the input data being hovering sensor data corresponding to the user's hover. In yet another embodiment, the input device 220 may be a camera configured to detect a user's gesture, with the input data being gesture sensor data corresponding to the user's gesture.

In another embodiment, the input device 220 may be a light sensor configured to detect ambient light, with the input data being light sensor data corresponding to the ambient light. In yet another embodiment, the input device 220 may be a network interface configured to supply streaming data and a graphics content as the input data. In still yet another embodiment, the input device 220 may be a camera configured to supply video data, with the input data being the video data and overlay data supplied from an input source.

In another embodiment, the input device may be a biological sensor, such as a heart rate monitor or thermometer for measuring body temperature. For instance, the heart rate monitor may monitor a user's heart rate, providing input data including the user's instantaneous or average heart rate, or individual pulses. The thermometer may provide input data including the user's present or average body temperature.

The output device 230 may be any output device capable of receiving output data and outputting corresponding output signals. For example, the output device 230 may be a display panel configured to display an image using image data, with the output data being the image data adjusted to reflect a user's touch. In another embodiment, the output device 230 may be a sound device configured to play sound using sound data, with the output data being the sound data adjusted to reflect a user's hover. In yet another embodiment, the output device 230 may be a display panel configured to display an image using image data, with the output data being the image data adjusted to reflect a user's gesture. In still yet another embodiment, the output device 230 may be a display panel configured to display an image using image data, with the output data being the image data adjusted to reflect the ambient light.

In another embodiment, the output device 230 may be a display panel configured to display an image using image data, with the output data being streaming data converted into the image data and overlaid with a graphics content. Here, the output rendering engine may be further configured to adjust a display location of the overlaying graphics content according to a content of the image data. In yet another embodiment, the output device 230 may be a display panel configured to display an image using image data, with the output data being video data converted into the image data and overlaid with overlay data.

In another embodiment, the I/O processor 100 may further include a display buffer configured to receive image data from the device processor 210, the output device 230 may be a display panel configured to display an image using the image data, the output rendering engine may be further configured to overlay the image data from the display buffer with overlay data from an overlay buffer, with the output data being the image data as overlaid by the overlay data. Here, the control interface 130 may include the overlay buffer configured to transfer the processed input data as the overlay data.

Figure 2:
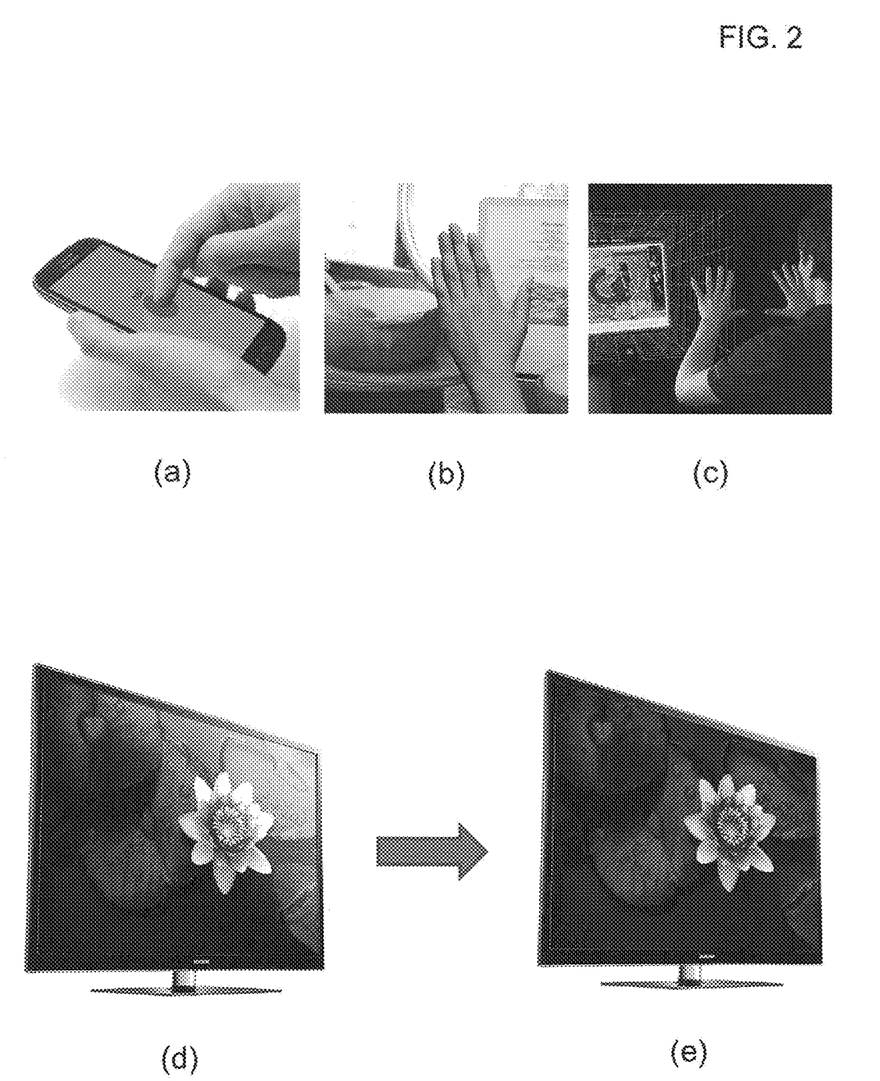
FIGS. 2-3 illustrate example applications of embodiments of the present invention to various user devices.
Figure 3:
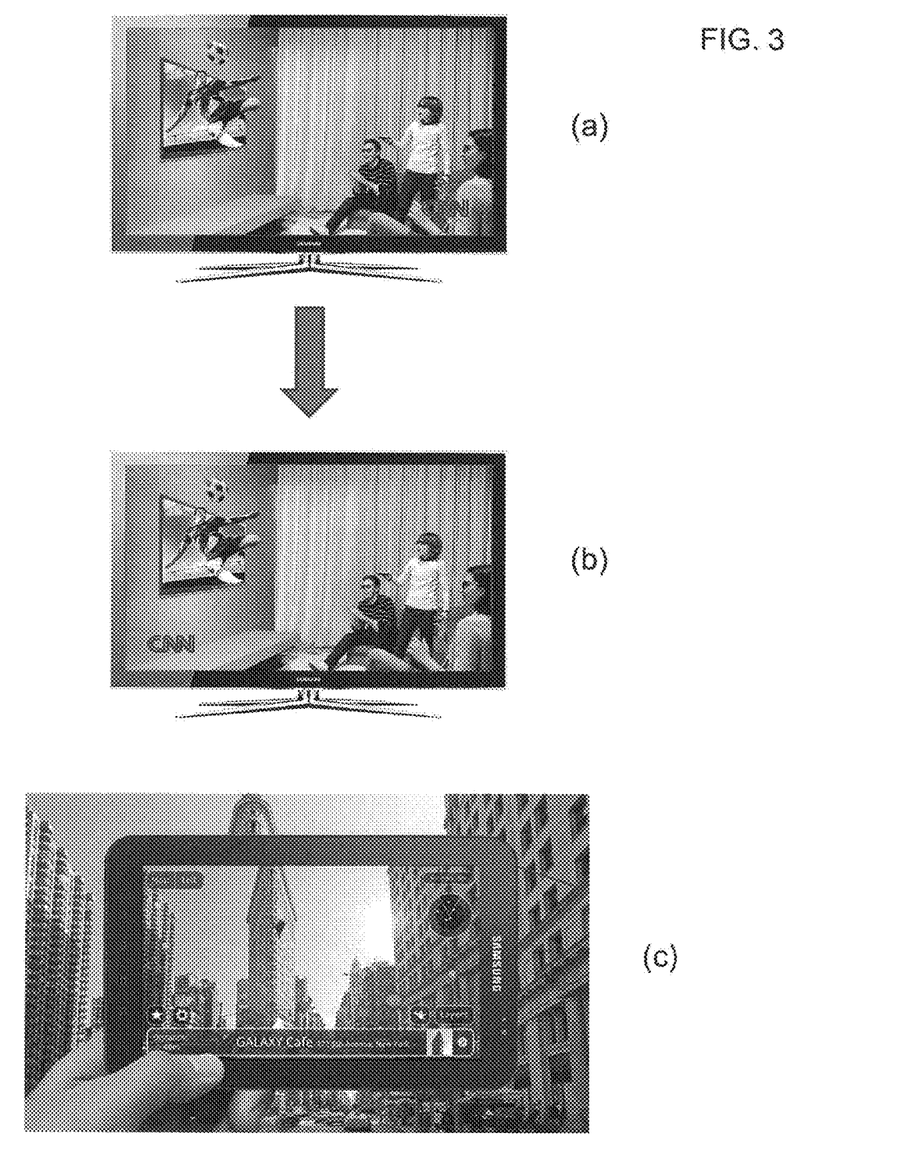

FIGS. 2-3 illustrate the application of example integrated I/O devices according to embodiments of the present invention as applied to various user devices.

For example, FIGS. 2a-2c illustrate low-latency input feedback without going through a corresponding user device. According to embodiments of the present invention, the input feedbacks are generated by an integrated I/O device to output components directly. For instance, in FIG. 2a, a user is touching the screen of a smartphone, which includes a touch screen having a touch sensor configured to detect the user's touch. The display screen of the smartphone is responding by outputting a circle corresponding to the user's touch, that is, adjusting the image data used to drive the display screen to reflect the user's touch.

While in comparable smartphones, this type of feedback takes place within the operating system and processors of the smartphone (and which competes with all of the other apps on the smartphone), in an embodiment of the present invention, an integrated input control and output rendering device (or integrated I/O device or integrated I/O controller) directly processes the user input touch and immediately outputs the corresponding circle without disturbing the normal application processing taking place on the smartphone.

Likewise, in FIG. 2b, a user is providing a gesture command to a tablet computer to stop speaking. The tablet computer is reading aloud a recipe that the user is preparing. The stop command (an open palm facing the tablet computer) is being directly interpreted by, for example, a hovering sensor configured to detect the user's hover, and sent to the output renderer, which processes the command as a request to directly silence the speaker, that is, adjust the sound data to reflect the user's hover. This action takes place immediately as opposed to waiting for the apps on the tablet computer to do the same processing in competition with the other apps.

In FIG. 2c, a user is manipulating a window on a computer's display device by using hand gestures. The display device includes a camera configured to detect the user's gesture. Here, the hand gestures indicate a counter-clockwise rotation movement, which is interpreted by an integrated I/O device directly and then sent to the display device, which rotates the window accordingly, this is, the image data normally sent to the display device is adjusted to reflect the user's gesture. This adjustment takes place immediately (or with very little delay), as opposed to waiting for the operating system on the computer to respond.

FIGS. 2d-2e illustrate ambient light compensation on a display panel of a display device, such as for a home theater or personal computer. A built-in light sensor configured to detect ambient light provides light sensing signals to the integrated I/O controller, which directly generates corresponding color compensations and adjustments according to the environment and has the display device display with the appropriate compensations, that is, the image data for driving the display panel is adjusted to reflect the ambient light. This adjustment takes place without going through the display device's or personal computer's processor or operating system. Accordingly, an overly bright screen in FIG. 2d is converted to a better image in FIG. 2e by the integrated I/O device that operates directly in the display device and can be customized to the characteristics of the specific display panel.

FIGS. 3a-3b illustrate an example intelligent content placement taking place on another display device, which includes a network interface configured to supply streaming data (such as an event or movie broadcast) and a graphics content (such as a logo) as the input data. Without the intelligent content placement, logos, captions, and other pop-up information may be displayed in an inappropriate portion of the screen, such as in FIG. 3a, where a broadcaster's logo is being displayed in a lower right portion of the screen, which is presently showing a busy image, thus obscuring the logo.

However, according to embodiments of the present invention, an integrated I/O controller can take the logo as an input signal directly and place it in an appropriate portion of the display panel, factoring in considerations such as optimizing for content layout, color balance, and panel longevity. That is, the output rendering engine of the integrated I/O controller is further configured to adjust a display location of the overlaying graphics content according to a content of the image data, with the output data being the streaming data converted into the image data and overlaid with the graphics content. This can take place directly in the display device via the integrated I/O controller rather than in the image processing components used to provide the content of the display panel.

In FIG. 3c, an example directly-augmented information display on a tablet computer is illustrated. Here, the display panel of the tablet is showing a camera view of the scene in front of the tablet (i.e., the tablet includes a camera configured to supply video data). The camera image is augmented with overlay data, in this case several icons pointing out local features, such as a large icon in the center of the image pointing out an intended destination. The display composition rendering of information from different input sources can be more efficiently displayed (in, for example, both time and power) if it is offloaded from (and bypasses) the tablet device and all of the other user apps running on the tablet and is instead processed directly by an integrated I/O device for the tablet. Accordingly, the video data is processed directly by the integrated I/O device and overlaid with the overlay data as part of the output data supplied by the integrated I/O device to the tablet's display panel.

Figure 4:
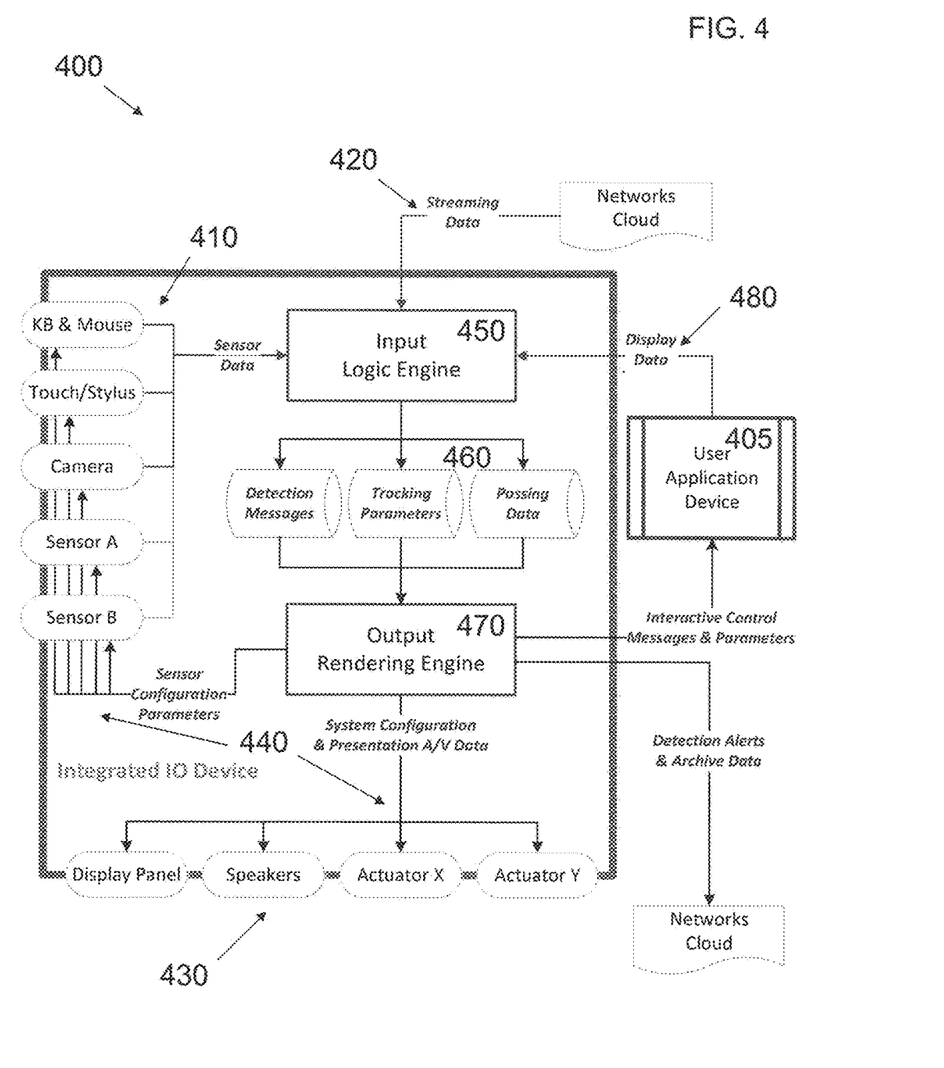
FIG. 4 is a block diagram of an integrated I/O device according to an embodiment of the present invention.

According to an example embodiment of the present invention, an integrated input control and output rendering system (integrated I/O controller) includes input components, output components, a centralized logic unit to process and interpret incoming signals, and a rendering unit to generate and combine display data and feedback effects. FIG. 4 is a block diagram of an integrated I/O device 400 according to an embodiment of the present invention.

The integrated I/O device 400 may be part of a processor-driver user device 405, such as a smartphone, display device, or touch screen. The user device 405, for example, may run apps and an operating system, display routines, or touch sensing routines on one or more user device processors. The integrated I/O device 400 includes its own dedicated processor (or processors) for doing its processing independently of the user device's processors (and any corresponding routines, operating system, or apps).

Referring to FIG. 4, the input to the integrated I/O device 400 may be a combination of various sensors 410, (for example, keyboard, mouse, touch-sensor (such as for a stylus), sound-sensor, thermometer, gyro-accelerometer, GPS, camera, heart rate monitor or other biological sensor, etc.), and passing-in data 420 (for example, from the cloud, a user device, a network such as the Internet, or other streaming data source). By contrast, the output of the integrated I/O device 400 may be a collection of actuators 430, including a visual display, speakers, as well as sensor enabling active emitters, such as structured light, ultrasound, etc. Both the inputs 410 and the outputs 430 are configured according to their corresponding parameters 440, for example, in the form of register parameters, called settings, which can be modified directly through, for example, calling system configuration API (application programming interface) or indirectly through programming internal logic.

A dedicated input logic engine 450 that takes input signals (such as sensor data from the sensors 410, passing-in data 420 from the streaming data sources, and display data 480 from the user device 405) and outputs standardized control interface 460 to a dedicated output rendering engine 470 that composes logic outputs into the desired formats according to receiving devices and actuators 430 and user configuration data (such as from the user device 405) may share the same I/O processor in the integrated I/O device 400. By splitting the feedback logic of sensors 410 and other input controls into a separate dedicated processor outside of the main processor (that is dedicated to user applications), faster response times (and faster apparent response times) are achieved, thus improving the user experience.

In an example input logic engine and command interface according to an embodiment of the present invention, there are two basic types of input data: single event data and continuous event data. Single event data refers to input data provided for a single event or time, for example, with a single time-stamp from an activity conduct that takes place once per request through a set or predefined procedure. Examples of single event data may include the input from taking a photograph, measuring a temperature (such as ambient temperature or body temperature), acquiring a location, etc.

Continuous event data, on the other hand, refers to input data provided for multiple events or over a period of time, for example, consecutive data triggered by separate requests to start and end. Examples of continuous event data may include, for example, shooting a video, moving a mouse, following a person, monitoring the temperature, monitoring the user's heart rate, etc.

The input sources may be any data sources including, for example, sensing signals from 1D sensors or 2D cameras (such as from sensors 410), passing-through data from networks and streaming services (such as streaming data 420), and display image data 480 from application devices and graphics hardware (such as from user device 405). The same input source may output data of either event type (e.g., single or continuous) depending on its configuration settings (such as a camera, which may take a still picture or shoot a video).

As shown in FIG. 4, the input logic engine 450 translates input events into data 460 for the output rendering engine 470 following a common interface (such as a standardized common interface), which may include the following types of data: passing data, detection messages, and tracking parameters. The passing data refers to signals in formats native to the sources, such as images from a camera, display data from a graphics card, temperature from a thermometer, caption text from streaming services, etc. Detection messages, by contrast, refer to processed input data, such as alarm signals triggered by various (such as preset) conditions and thresholds. These may include simple alarms (like temperature (e.g., body temperature) or heart rate exceeding a certain threshold) or more complex determinations, include motion detection, smoke detection, face detection, gesture detection, etc. A probability or confidence rate is often associated with such signals.

Tracking parameters may refer to combinations of correlated input signals, such as input signals having a same shared association or identity. For example, with touch events, the touches of the same finger may be considered as signals of the same track, or be denoted by the same tracking identification (tracking ID). In a similar manner, the gestures of the same hand may be denoted by the same tracking ID. Here, the tracking parameters may represent actual coordinates.

Thus, both detection messages and tracking parameters may be, for example, direct derivatives of some single input sensor, or more sophisticated combinations of multiple input sensors, or even more intelligent interpretations derived with help from one or more sources of collected data, such as a database or set of individual statistics. According to an example integrated I/O device, a generic/standard interface is provided to handle the general input data.

The output rendering engine 470 takes output 460 of the input logic engine 450 as input and renders the output into the desired format of the individual output components 430. The rendered output may include, for example, bypass commands, device reconfigurations, audio-visual displays, other actuators, or network devices. Bypass commands refers to passing command signals from the input logic engine 450 to the user device 405. Device reconfigurations refers to taking action from those command signals that are related to reconfiguring and resetting various I/O device parameters. Audio-visual displays refers to sending visual data (intended for the main display panel) and sound track data (intended for speakers) in their native resolution and quality, by composing the input data, for example, from user devices, network services, and pre-configured I/O responses, into corresponding visual or audio signals and augmenting (or possibly replacing) existing visual or audio data intended for these same output devices 430.

In addition, other actuators refers to passing or otherwise distributing relevant commands to other connected actuators and robotics. Network devices refers to delivering data and signals (for instance, detection alerts and archive data), to various networks or cloud repositories, such as for system archives or alarm alerts. According to an example embodiment of the present invention, the output data is reformatted to meet the specific formats of the corresponding targeted output devices or components.

Figure 5:
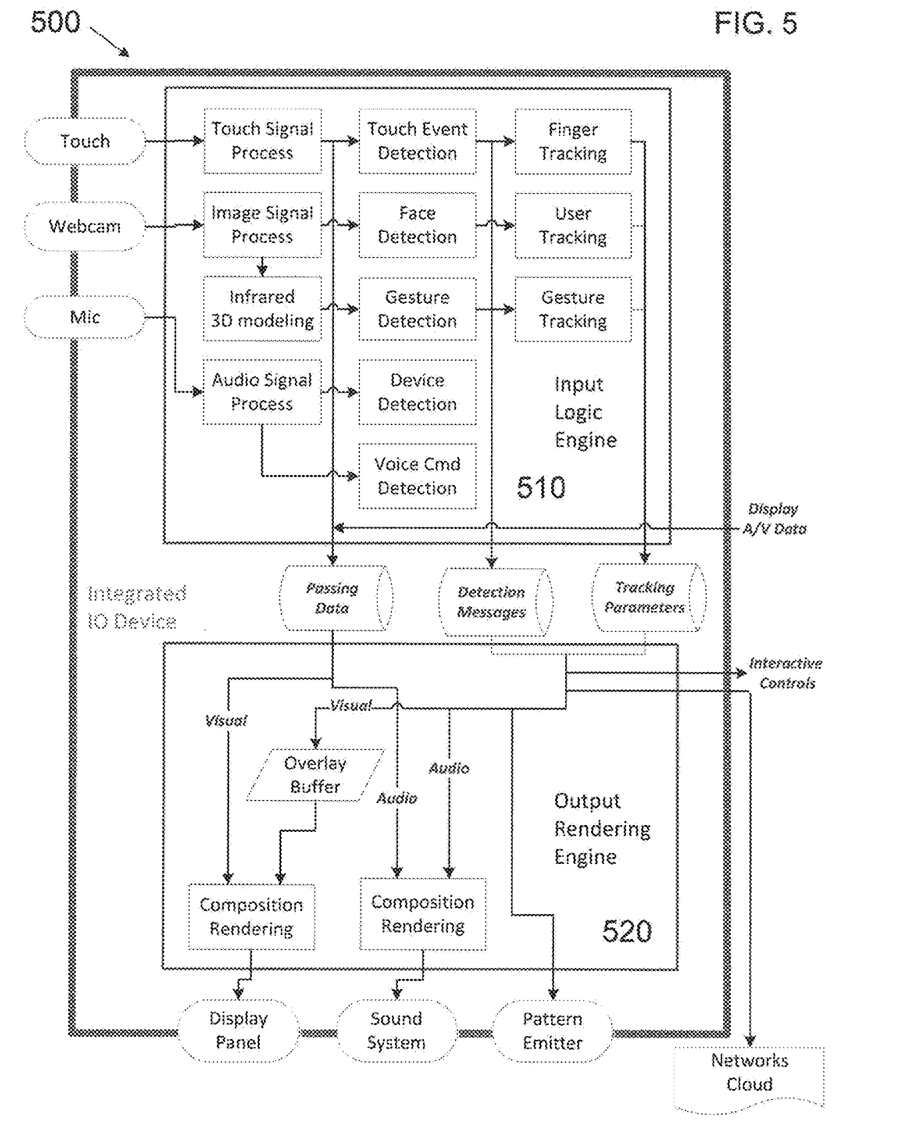
FIG. 5 is a block diagram of an example integrated I/O device according to an embodiment of the present invention.

FIG. 5 is a block diagram of an example integrated I/O device 500 according to an embodiment of the present invention.

The integrated I/O device 500 of FIG. 5 and described here is for a user device that includes a touch enabled high-resolution display panel integrated with an infrared capable webcam, an infrared pattern emitter for 3D detection and construction, a microphone that is capable of detecting an extended range of sounds (including ultrasound), and a stereo sound system. The user device also includes two built-in wireless communication channels, one for communicating over the cloud and internet (e.g., a WiFi connection), and the other for high-speed local device communication (e.g., a WiDi or WiGig connection). Thus, in summary, the integrated I/O device 500 (at a minimum) receives input from three input components (a touch screen, a webcam, and a microphone) and outputs data, signals, and commands to three output components (a display panel, a stereo sound system, and an infrared pattern emitter) using two network connections (e.g., WiFi to cloud and WiDi/WiGig to the user device).

As shown in FIG. 5, the input logic engine 510 includes a collection of modules that handle sensor signal processing, pre-configured event detection, and real-time monitoring and tracking, and outputs its results to the output rendering engine 520. Then the output rendering engine 520 proceeds (1) to pass control commands to the user device, (2) to create instant touch and gesture responses and feedbacks to corresponding audio effects and visual displays (while bypassing application logic, processor, and operating system of the user device), (3) to pull in additional streaming text and sound content from network servers and devices, (4) to integrate all visual data properly rendered for display on the display screen (such as combining, overlaying, or adjusting different video signals), (5) to integrate all sound effects (as triggered, for example, by input events or commands) with audio data being passed down from audio data sources (such as sound tracks), and (6) to turn on the infrared emitter for 3D modeling construction when it is requested.

For fast (and perhaps in some sense, optimal) visual data rendering, all touch and gesture responses and feedbacks may be first rendered into a dedicated overlay buffer (for example, with transparency alpha channel; that is, the degree of transparency of the overlay may be controllable by a parameter alpha, such as between 0 and 100%). The latest overlay buffer may then be combined with the active display data (for example, the usual video feed intended for the display panel) right before its presentation to significantly reduce or minimize any latency delay (e.g., from the input touches and gestures to the output responses and feedbacks).

Figure 6:
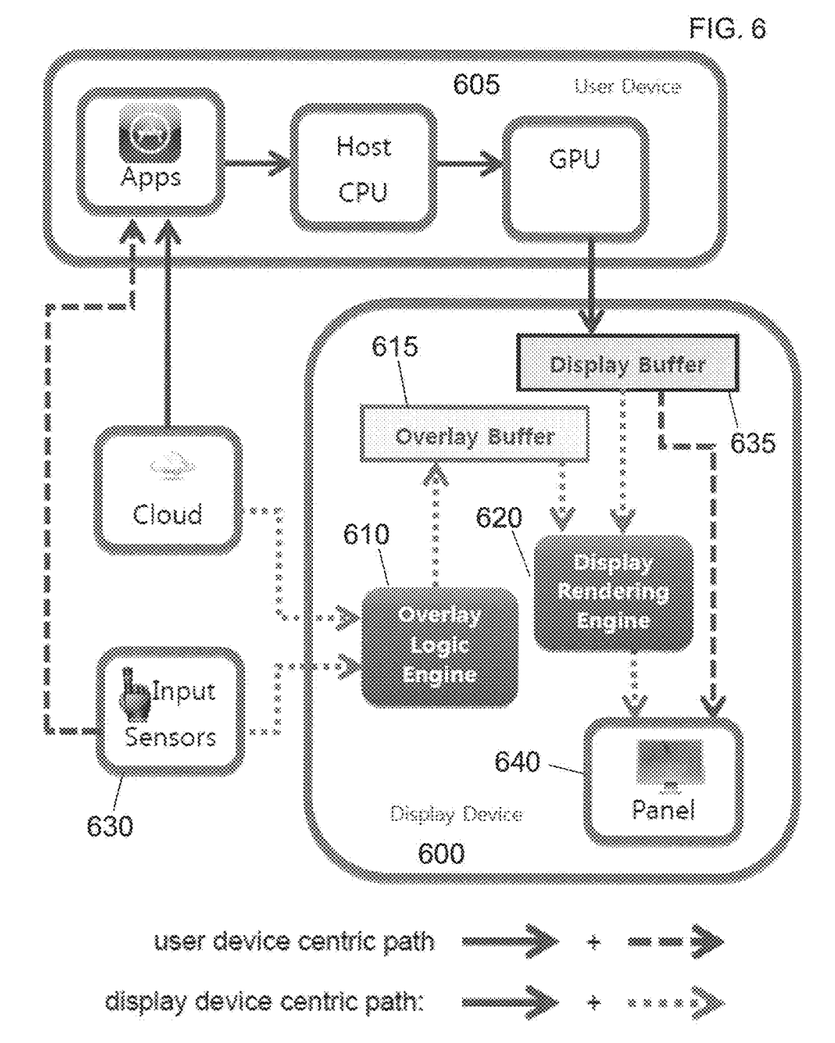
FIG. 6 is a block diagram of an example display-device-centric display device according to an embodiment of the present invention as compared to a comparable user-device-centric display device of existing processor-driver user devices.

FIG. 6 is a block diagram of an example display-device-centric display device 600 according to an embodiment of the present invention as compared to a comparable user-device-centric display device of an existing processor-driver user device 605.

For example, as an intermediate embodiment to more fully developed integrated I/O devices discussed above, display centric devices may provide much of the same functionality. As shown in FIG. 6, an overlay buffer 615 (for example, as part of a control interface) with overlay logic unit 610 is added into an existing display device 600, which allows input sensors 630 to be integrated as system components, and input signals are passed directly into the display device 600 using the display-device-centric paths as illustrated (and in contrast to existing display devices using the user-device-centric paths through user device 605, including the apps, processor, operating system, and graphics unit of the user device 605).

Thus, display buffer 635, which receives graphical output from the user device 605 (such as from a GPU of the user device 605) has its content overlaid or otherwise merged with that of the overlay buffer 615 by display rendering engine 620, which is configured to overlay the image data from the display buffer 635 with the overlay data from the overlay buffer 615, and then supply the image data (as overlaid by the overlay data) as output data to a display panel 640.

Another embodiment of the present invention is to put the integrated I/O design as a component unit within a user device. That is, a dedicated I/O processor is added to provide the functionality of the input logic engine and the output rendering engine as a separate processor from the main user device processor. This provides for a low latency design where user interaction feedback is handled by the dedicated I/O processor directly without going through the user device processor (such as a main application processor or other processor), together with corresponding display or touch routines, operating system, or user apps competing for processing time on the application processor. Thus, the display (or other rendering) of feedback information is not an aftermath decision from the applications being run on the host CPU of the user device, but rather an instant reaction of the dedicated I/O processor that is based on (or customized to) the device's or applications' configuration.

Figure 7:
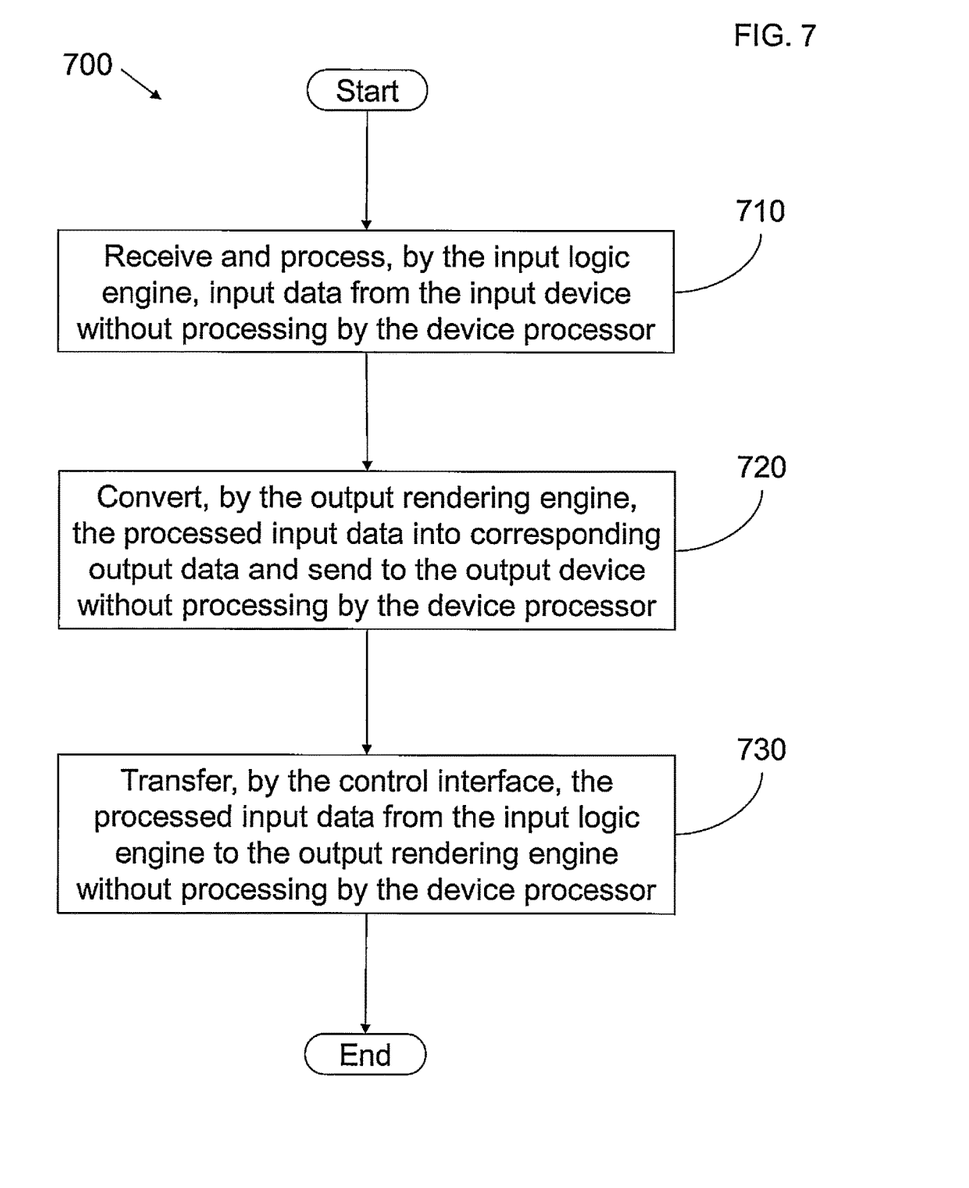
FIG. 7 is a flowchart illustrating an example method of controlling input/output (I/O) of a user device by an I/O processor according to an embodiment of the present invention.

FIG. 7 is a flowchart illustrating an example method 700 of controlling input/output (I/O) of a user device by an I/O processor according to an embodiment of the present invention. By way of example, the user device may be the same as or similar to the user device 200 of FIG. 1 and include comprising a device processor 210, an input device 220, and an output device 230, while the I/O processor may be the same as or similar to the I/O processor 100 of FIG. 1 and include an input logic engine 110, an output rendering engine 120, and a control interface 130. It should be noted that the order of the steps may be changed as would be apparent to one of ordinary skill, and the present invention is not limited thereto.

Processing begins, and in step 710, the input logic engine 110 receives and processes input data from the input device 220 without processing by the device processor 210. That is, the input logic engine 110 does the receiving and processing of the input data from the input device 220 in place of the device processor 210. The device processor 210, however, is still free to do other processing while the input logic engine 110 does the receiving and processing of the input data from the input device 220.

In step 720, the output rendering engine 120 converts the processed input data into corresponding output data and sends to the output device 230 without processing by the device processor 210. That is, the output rendering engine 120 does the converting and sending of the processed input data to the output device 230 in place of the device processor 210. The device processor 210, however, is still free to do other processing while the output rendering engine 120 does the converting and sending of the processed input data to the output device 230.

In step 730, the control interface 130 transfers the processed input data from the input logic engine 110 to the output rendering engine 120 without processing by the device processor 210. That is, the control interface 130 does the transferring of the processed input data from the input logic engine 110 to the output rendering engine 120 in place of the device processor 210. The device processor 210, however, is still free to do other processing while the control interface 130 does the transferring of the processed input, data from the input logic engine 110 to the output rendering engine 120.

In summary, embodiments of the present invention provide for an independent I/O device capable of delivering much lower latency turnaround for processing user input or transactions and their corresponding display (or other output) feedback, allowing, for example, smart content placement to be decided by the display panel (which, for example, may extend display panel longevity), enabling panel specific compensated display (to provide, for example, a power-saving option, local environment color adjustment, etc.), supporting direct AR (aspect ratio) information display from a content data source (such as a predefined content data source) with shortcuts for power saving, supporting low latency and low power data path, and supporting a dual frame feature to balance the requirements of high performance and low power.

While the present invention has been described in connection with certain example embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An input/output (I/O) processor for controlling I/O of a user device comprising a device processor, an input device, and an output device, the I/O processor comprising:
    an input logic engine configured to receive and process input data from the input device without processing by the device processor and while the device processor supplies image data for driving a display panel;
    an output rendering engine configured to convert the processed input data into corresponding output data and send to the output device without processing by the device processor; and
    a control interface configured to transfer the processed input data from the input logic engine to the output rendering engine without processing by the device processor.

2. The I/O processor of claim 1, wherein
    the input device comprises a touch sensor configured to detect a user's touch,
    the input data comprises touch sensor data corresponding to the user's touch,
    the output device comprises the display panel configured to display an image using the image data, and
    the output data comprises the image data adjusted to reflect the user's touch.

3. The I/O processor of claim 1, wherein
    the input device comprises a hovering sensor configured to detect a user's hover,
    the input data comprises hovering sensor data corresponding to the user's hover,
    the output device comprises a sound device configured to play sound using sound data, and
    the output data comprises the sound data adjusted to reflect the user's hover.

4. The I/O processor of claim 1, wherein
    the input device comprises a camera configured to detect a user's gesture,
    the input data comprises gesture sensor data corresponding to the user's gesture,
    the output device comprises the display panel configured to display an image using the image data, and
    the output data comprises the image data adjusted to reflect the user's gesture.

5. The I/O processor of claim 1, wherein
    the input device comprises a light sensor configured to detect ambient light,
    the input data comprises light sensor data corresponding to the ambient light,
    the output device comprises the display panel configured to display an image using the image data, and
    the output data comprises the image data adjusted to reflect the ambient light.

6. The I/O processor of claim 1, wherein
    the input device comprises a network interface configured to supply streaming data and a graphics content as the input data,
    the output device comprises the display panel configured to display images using the image data, the streaming data, and the graphics content,
    the output data comprises the streaming data overlaid with the graphics content, and
    the output rendering engine is further configured to adjust a display location of the overlaying graphics content according to a content of the streaming data.

7. The I/O processor of claim 1, wherein
    the input device comprises a camera configured to supply video data,
    the input data comprises the video data and overlay data supplied from an input source,
    the output device comprises the display panel configured to display images using the image data, the video data, and the overlay data, and
    the output data comprises the video data overlaid with the overlay data.

8. An input/output (I/O) processor for controlling I/O of a user device comprising a device processor, an input device, and an output device, the I/O processor comprising:
    an input logic engine configured to receive and process input data from the input device without processing by the device processor;
    an output rendering engine configured to convert the processed input data into corresponding output data and send to the output device without processing by the device processor;
    a control interface configured to transfer the processed input data from the input logic engine to the output rendering engine without processing by the device processor; and
    a display buffer configured to receive image data from the device processor,
    wherein
        the output device comprises a display panel configured to display an image using the image data,
        the control interface comprises an overlay buffer configured to transfer the processed input data as overlay data,
        the output rendering engine is further configured to overlay the image data from the display buffer with the overlay data from the overlay buffer, and
        the output data comprises the image data as overlaid by the overlay data.

9. A method of controlling input/output (I/O) of a user device by an I/O processor, the user device comprising a device processor, an input device, and an output device, the I/O processor comprising an input logic engine, an output rendering engine, and a control interface, the method comprising:
    receiving and processing, by the input logic engine, input data from the input device without processing by the device processor and while the device processor supplies image data for driving a display panel;
    converting, by the output rendering engine, the processed input data into corresponding output data and sending to the output device without processing by the device processor; and
    transferring, by the control interface, the processed input data from the input logic engine to the output rendering engine without processing by the device processor.

10. The method of claim 9, wherein
    the input device comprises a touch sensor configured to detect a user's touch,
    the output device comprises the display panel configured to display an image using the image data, and the method further comprises:
  receiving, by the input logic engine, touch sensor data corresponding to the user's touch as the input data from the touch sensor; and
  adjusting, by the output rendering engine, the image data to reflect the user's touch and sending the adjusted image data as the output data to the display panel.

11. The method of claim 9, wherein
the input device comprises a hovering sensor configured to detect a user's hover,
the output device comprises a sound device configured to play sound using sound data, and
the method further comprises:
  receiving, by the input logic engine, hovering sensor data corresponding to the user's hover as the input data from the hovering sensor; and
  adjusting, by the output rendering engine, the sound data to reflect the user's hover and sending the adjusted sound data as the output data to the sound device.

12. The method of claim 9, wherein
the input device comprises a camera configured to detect a user's gesture,
the output device comprises the display panel configured to display an image using the image data, and
the method further comprises:
  receiving, by the input logic engine, gesture sensor data corresponding to the user's gesture as the input data from the camera; and
  adjusting, by the output rendering engine, the image data to reflect the user's gesture and sending the adjusted image data as the output data to the display panel.

13. The method of claim 9, wherein
the input device comprises a light sensor configured to detect ambient light,
the output device comprises the display panel configured to display images using the image data, and
the method further comprises:
  receiving, by the input logic engine, light sensor data corresponding to the ambient light as the input data from the light sensor; and
  adjusting, by the output rendering engine, the image data to reflect the ambient light and sending the adjusted image data as the output data to the display panel.

14. The method of claim 9, wherein
the input device comprises a network interface configured to supply streaming data and a graphics content as the input data,
the output device comprises the display panel configured to display images using the image data, the streaming data, and the graphics content, and
the method further comprises:
  receiving, by the input logic engine, the streaming data and the graphics content as the input data from the network interface;
  overlaying, by the output rendering engine, the streaming data with the graphics content and sending the overlaid streaming data as the output data to the display panel; and
  adjusting, by the output rendering engine, a display location of the overlaying graphics content according to a content of the streaming data.

15. The method of claim 9, wherein
the input device comprises a camera configured to supply video data,
the output device comprises the display panel configured to display images using the image data and the video data, and
the method further comprises:
  receiving, by the input logic engine, video data from the camera and overlay data from an input source; and
  overlaying, by the output rendering engine, the video data with the overlay data and sending the overlaid video data as the output data to the display panel.

16. A method of controlling input/output (I/O) of a user device by an I/O processor, the user device comprising a device processor, an input device, and an output device, the I/O processor comprising an input logic engine, an output rendering engine, and a control interface, the method comprising:
  receiving and processing, by the input logic engine, input data from the input device without processing by the device processor;
  converting, by the output rendering engine, the processed input data into corresponding output data and sending to the output device without processing by the device processor; and
  transferring, by the control interface, the processed input data from the input logic engine to the output rendering engine without processing by the device processor,
  wherein
    the I/O processor further comprises a display buffer configured to receive image data from the device processor,
    the output device comprises a display panel configured to display an image using the image data,
    the control interface comprises an overlay buffer configured to transfer the processed input data as overlay data, and
    the method further comprises overlaying, by the output rendering engine, the image data from the display buffer with the overlay data from the overlay buffer and sending the overlaid image data as the output data to the display panel.

17. A display device comprising:
  a display device processor for supplying image data;
  an input device;
  a display panel configured to display an image using the image data; and
  an input/output (I/O) processor for controlling I/O of the display device, the I/O processor comprising:
    an input logic engine configured to receive and process input data from the input device without processing by the display device processor and while the display device processor supplies the image data for driving the display panel;
    an output rendering engine configured to convert the processed input data into corresponding output data and send to the display panel without processing by the display device processor; and
    a control interface configured to transfer the processed input data from the input logic engine to the output rendering engine without processing by the display device processor.

18. The display device of claim 17, wherein
the input device comprises a touch sensor configured to detect a user's touch, the input data comprises touch sensor data corresponding to the user's touch, and the output data comprises the image data adjusted to reflect the user's touch.

19. The display device of claim 17, wherein the input device comprises a camera configured to detect a user's gesture, the input data comprises gesture sensor data corresponding to the user's gesture, and the output data comprises the image data adjusted to reflect the user's gesture.

20. The display device of claim 17, wherein the input device comprises a light sensor configured to detect ambient light, the input data comprises light sensor data corresponding to the ambient light, and the output data comprises the image data adjusted to reflect the ambient light.

* * * * *